No. 664,550. Patented Dec. 25, 1900.
H. L. HOLLIS.
ELECTROLYTIC TREATMENT OF IRON FOR PRESERVATION THEREOF.
(Application filed Feb. 20, 1899. Renewed May 16, 1900.)
(No Model.)
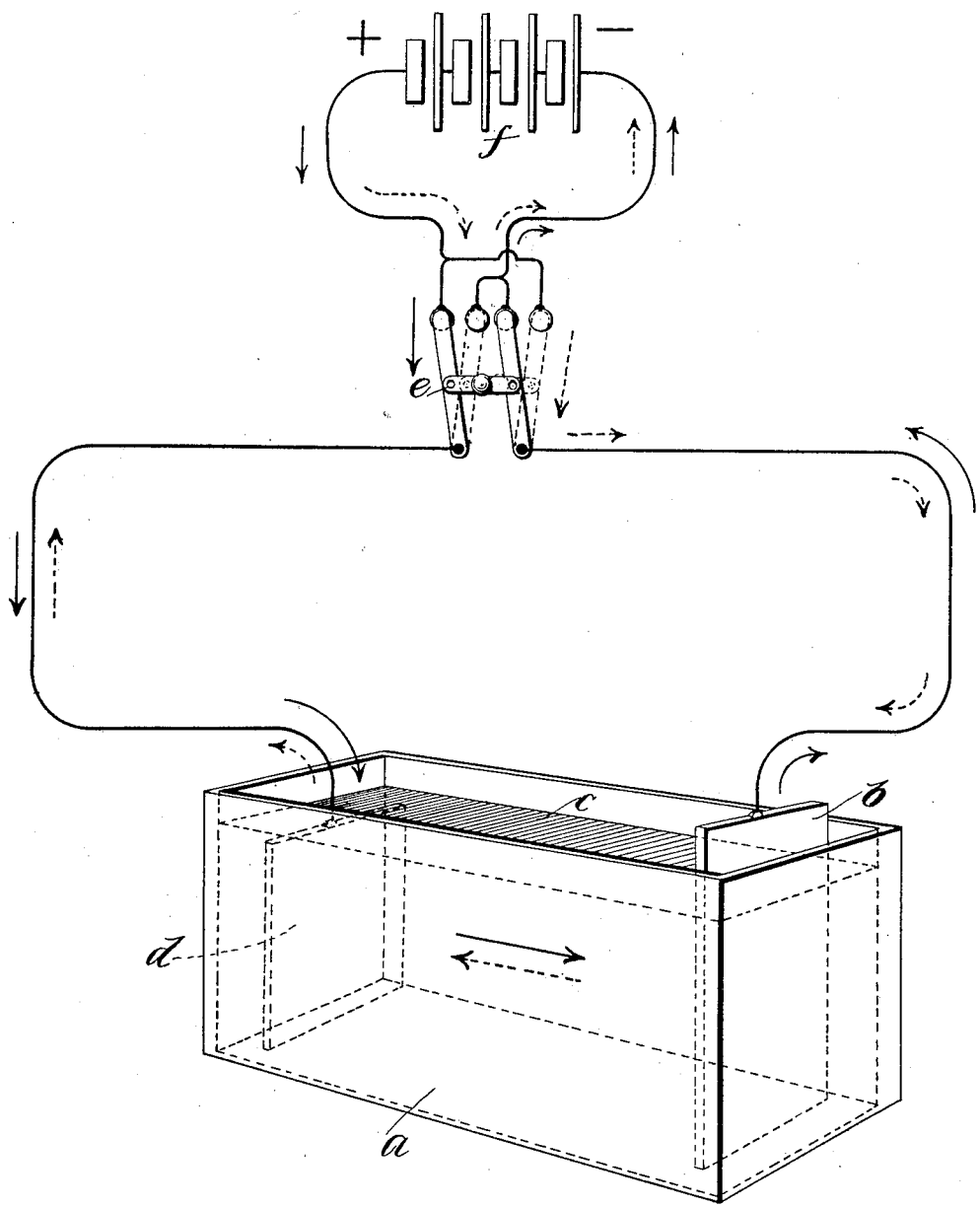
Witnesses:
George L. Cragg.
J. H. C. Bennet.
Inventor:
Henry L. Hollis.
By Barton & Brown
Attorneys.

UNITED STATES PATENT OFFICE.

HENRY L. HOLLIS, OF CHICAGO, ILLINOIS.

ELECTROLYTIC TREATMENT OF IRON FOR PRESERVATION THEREOF.

SPECIFICATION forming part of Letters Patent No. 664,550, dated December 25, 1900.

Application filed February 20, 1899. Renewed May 16, 1900. Serial No. 16,917. (No specimens.)

*To all whom it may concern:*

Be it known that I, HENRY L. HOLLIS, a citizen of the United States, residing at Chicago, in the county of Cook and State of Illinois, have invented a certain new and useful Improvement in Electrolytic Treatment of Iron for the Preservation Thereof, (Case No. 4,) of which the following is a full, clear, concise, and exact description.

My invention relates to a method of treating iron objects electrolytically for the formation of protective coatings of iron oxid thereon.

I have heretofore devised a process for forming protective coatings of iron oxid upon steel or iron objects, as disclosed in my Patent No. 621,084, issued March 14, 1899. Generally speaking, the said method of applying preservative coatings of iron oxid consisted in subjecting the iron object to be treated to an oxidizing reagent and passing a current of electricity from said object through the oxidizing reagent to furnish oxidizing conditions at the surface of the iron object to cause the union of oxygen with the iron. I have had no difficulty in practicing the aforesaid process where the iron to be treated had perfectly-clean surfaces. I have experienced difficulty, however, in treating commercial-iron products, as substances interfering with the proper electrolytic action are frequently found upon the surface portions. In handling the iron objects foreign material was likely to be placed upon the surface portions and interfere with securing a satisfactory coating.

It is the object of my invention to clean iron objects and to coat the surfaces thereof with protective coatings of iron oxid by one electrolytic treatment, whereby the iron need not be handled after it has been cleaned, the proposed process thus being a simple and cheap one whose results are perfectly assured. To this end I employ an electrolyte which under proper circuit conditions is adapted to perform the double function of cleaning the iron objects and of furnishing oxidizing conditions at the surface portions thereof to form protective coatings of iron oxid. More specifically, I employ an electrolyte which with the current flowing in one direction is adapted to effect the removal of foreign substances from iron objects and with the current flowing in the opposite direction is adapted to furnish oxidizing conditions at the surface of the iron objects to create protective coatings of iron oxid, which by reason of the cleanly condition of the iron is firmly united with the unchanged portion of the iron beneath the oxid. I preferably subject the iron object to be treated to a caustic-alkali solution, as a solution of NaOH, which furnishes alkaline conditions at the iron object. By a "caustic" or "alkaline" solution I mean a solution which under the influence of electricity is adapted to furnish alkaline conditions at the iron object. The time during which the cleaning of the iron object is being effected is usually very short, so that by my improved process the cleaning and oxidizing of the iron is effected in practically one operation. The means which I employ for controlling the direction of the current through the electrolyte is preferably a pole-changing switch, which in the process above described is first thrown to connect the iron to be treated as a cathode a sufficient length of time to effect the removal of the foreign substances from the iron, whereupon the switch is reversed to connect the iron object as an anode in the electrolytic circuit to furnish the required oxidizing conditions at the surface portions of the iron object to create a protective coating of iron oxid thereon.

The apparatus for practicing the method of my present invention is diagrammatically shown in the accompanying drawings, in which the receptacle $a$ is provided with a suitable electrolytic bath element $b$ in the electrolyte $c$, which element may be of iron or other suitable material which is adapted to serve both as an anode and a cathode, the iron object $d$ that is to be treated being immersed within the electrolyte. A pole-changing switch $e$ is provided for reversing the direction of the current flowing through the electrolytic circuit from the battery or other source of electricity $f$. The pole-changing switch in the position shown in dotted lines is adapted to effect the flow of current from the battery or other source of electricity $f$ through the electrolytic circuit in the direction indicated by the dotted arrows, the element $b$, with the switch in this position, constituting the anode, while the iron object constitutes the cathode. The electrolyte, which, as has been said, is preferably a solution of caustic soda, as NaOH, is adapted, under the influence of the current flowing in this direction, to furnish suitable conditions at the iron object to effect the desired result. After the iron object has been cleaned, which is effected in a very short time, the pole-changing switch $e$ is thrown to the position shown in full lines, whereupon current flows in the direction indicated by the arrows shown in full lines. The element $b$ then becomes the cathode and the iron object $d$ the anode, in which condition of the electrolytic circuit oxidizing conditions are furnished at the iron object, whereupon protective coatings of iron oxid are formed and firmly united with the cleaned iron. After the iron has been cleaned and coated, the flow of current through the same is discontinued. The character of the iron oxid formed depends very largely upon the electrical condition of the circuit. I have found that the iron may be satisfactorily cleaned and coated by employing a variety of strengths of solution and current. I preferably, however, employ a caustic-soda solution with the specific gravity of 1.25 to 1.40, heated to a temperature of 50° to 115° centigrade and with a current of from .005 to .30 amperes per square inch of anode-surface. The product that I thus create when the oxids obtained are such that they would rust without such treatment, especially where the iron is in the form of sheets, may be subjected to an annealing temperature for several hours, the temperature being preferably between 800° and 1,400° Fahrenheit. The coating of oxidized iron may be changed by this heating to the magnetic oxid. The temperature should be such that the coating will not be caused to scale.

While I have herein shown one form of apparatus for practicing my invention and have particularly described my preferred method, I do not wish to be limited thereto, as modifications may readily be made without departing from the spirit of my invention; but,

Having thus described my invention, I claim as new and desire to secure by Letters Patent—

1. The method of electrolytically treating iron objects to change the surface portions of the iron to protective coatings of iron oxid, which consists in temporarily inserting the object to be treated in a solution of caustic soda as an electrolyte, temporarily connecting said object as a cathode with a source of electricity, passing an electric current from said source through the electrolyte and iron object to remove foreign material from the object, thereafter temporarily connecting said object as an anode with a source of electricity, passing an electric current from said source through the iron object and electrolyte, whereby oxidizing conditions are furnished at the surface of the iron object and oxygen will there be united with the iron to form the protective coating, and thereupon discontinuing the flow of current through the iron object, substantially as described.

2. The method of electrolytically treating iron objects to change the surface portions of the iron to protective coatings of iron oxid, which consists in temporarily inserting the object to be treated in a solution of caustic alkali as an electrolyte, temporarily connecting the said object as a cathode with a source of electricity, passing an electric current from said source through the electrolyte and iron object to remove foreign material from the object, thereafter temporarily connecting said object as an anode with a source of electricity, passing an electric current from said source through the iron object and electrolyte, whereby oxidizing conditions are furnished at the surface of the iron object and oxygen will there be united with the iron to form the protective coating, and thereupon discontinuing the flow of current through the iron object, substantially as described.

3. The method of electrolytically treating iron objects to change the surface portions of the iron to protective coatings of iron oxid, which consists in temporarily inserting the object to be treated in a suitable oxidizing and cleaning reagent as an electrolyte, temporarily connecting the said object as a cathode with a source of electricity, passing an electric current from said source through the electrolyte and iron object to remove foreign material from the object, thereafter connecting said object as an anode with a source of electricity, passing an electric current from said source through the iron object and electrolyte, whereby oxidizing conditions are furnished at the surface of the iron object thereby causing oxygen to unite with the iron to form the protective coating, thereupon discontinuing the flow of current through the iron object, and removing said object from the bath, substantially as described.

4. The method of electrolytically treating iron objects to change the surface portions of the iron to protective coatings of iron oxid, which consists in subjecting the object to be treated to a suitable oxidizing and cleaning reagent, at the same time passing a current of electricity through said reagent and object to remove foreign material therefrom, thereafter passing a current of electricity through said object and reagent in a reverse direction to furnish oxidizing conditions at the surface of the object and cause the union of oxygen with the iron to change the surface portions of the iron object to a protective coating of iron oxid, thereupon discontinuing the flow of current through the iron object, and removing said object from the bath, substantially as described.

5. The method of electrolytically treating iron objects to change the surface portions of the iron to protective coatings of iron oxid, which consists in subjecting the object to be treated to a suitable oxidizing and cleaning reagent, at the same time passing a current of electricity through said reagent and object to remove foreign material from the object, thereafter continuing the flow of current to furnish oxidizing conditions at the surface of the iron object and cause the union of oxygen with the iron to change the surface portions of the iron object to a protective coating of iron oxid, thereupon discontinuing the flow of current through the iron object, and removing said object from the bath, substantially as described.

6. The method of electrolytically treating iron objects to change the surface portions of the iron to protective coatings of iron oxid, which consists in subjecting the object to be treated to a suitable oxidizing and cleaning reagent, at the same time passing a current of electricity through said reagent and object to remove foreign material therefrom, thereafter passing a current of electricity through said object and reagent in a reverse direction to furnish oxidizing conditions at the surface of the object and cause the union of oxygen with the iron to change the surface portions of the iron object to a protective coating of iron oxid, thereupon discontinuing the flow of current through the iron object, and removing said object from the bath, and subjecting the object to an annealing temperature, substantially at described.

In witness whereof I hereunto subscribe my name this 19th day of January, A. D. 1899.

HENRY L. HOLLIS.

Witnesses:
    WINFIELD W. LEACH,
    GEORGE L. CRAGG.